United States Patent [19]

Arenas

[11] 4,150,084

[45] Apr. 17, 1979

[54] METHOD OF MOLDING EGGSHELL THIN BODIES

[76] Inventor: Gabriel N. Arenas, 39 St. Jude La., Scotia, N.Y. 12302

[21] Appl. No.: 874,041

[22] Filed: Feb. 1, 1978

[51] Int. Cl.² ........................... B29C 5/00; B29C 1/12
[52] U.S. Cl. ..................................... 264/257; 264/271; 264/313
[58] Field of Search ............... 425/DIG. 44; 264/314, 264/259, 257, 271, 313, 314, 299, 161

[56] References Cited

U.S. PATENT DOCUMENTS

| | | | |
|---|---|---|---|
| 2,458,864 | 1/1949 | Lindsay | 425/DIG. 44 |
| 2,783,500 | 3/1957 | Lazar | 425/DIG. 44 |
| 3,124,092 | 3/1964 | Raynes | 425/DIG. 44 |

*Primary Examiner*—Willard E. Hoag
*Attorney, Agent, or Firm*—Kane, Dalsimer, Kane, Sullivan and Kurucz

[57] ABSTRACT

The disclosure is of a method for cast-molding very thin (eggshell type) body members. The thin members are useful, for example, in model making as components of model vehicles such as model airplanes. By the method of the invention a high degree of control of the thickness of the molded members may be obtained and very strong members produced with integrally molded support members.

4 Claims, 8 Drawing Figures

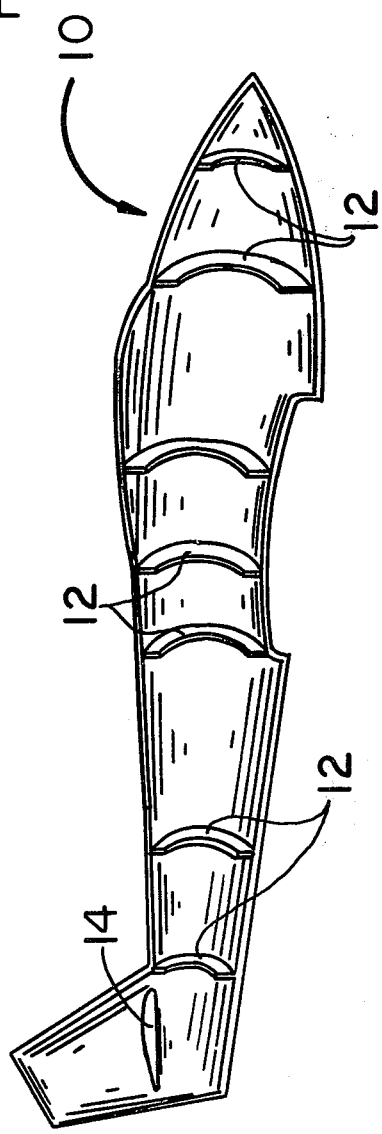
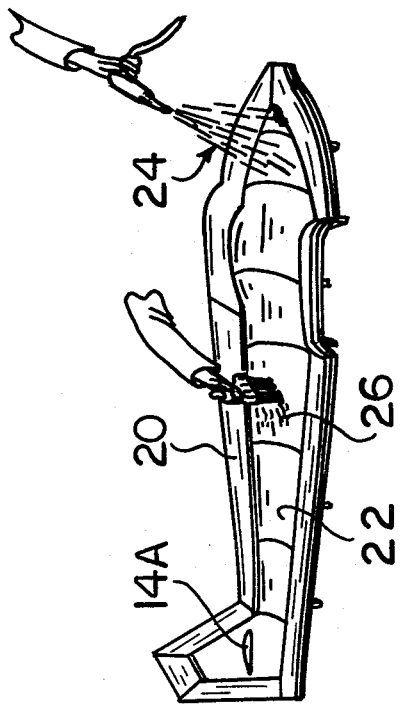
FIG. 2
FIG. 1

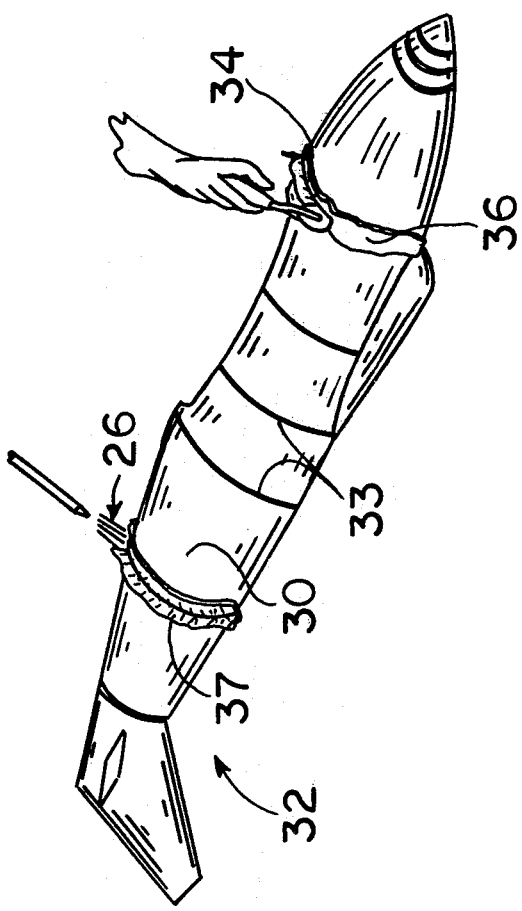
FIG. 3
FIG. 4

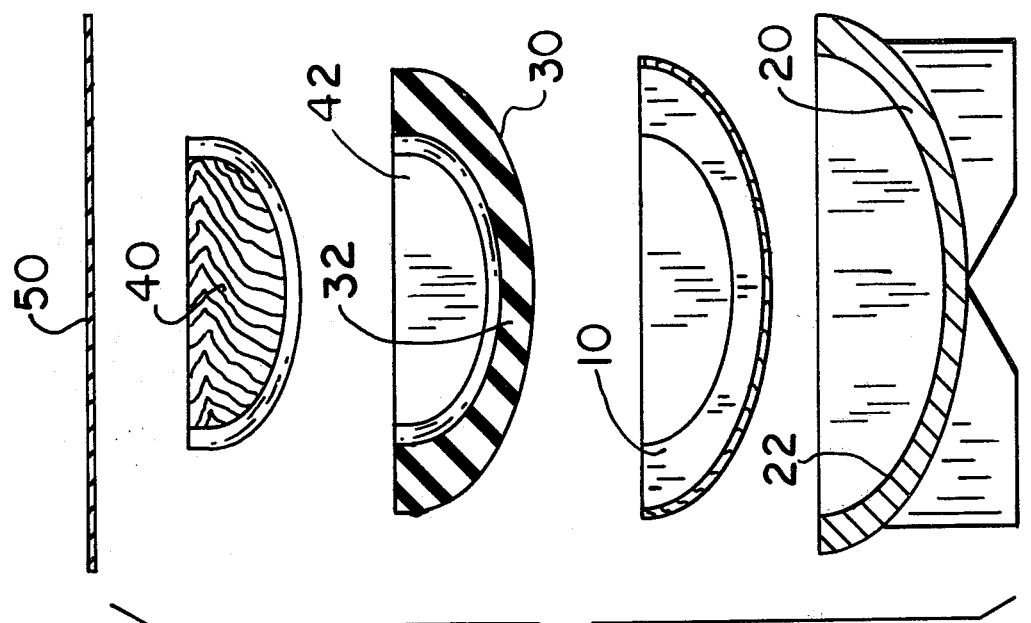
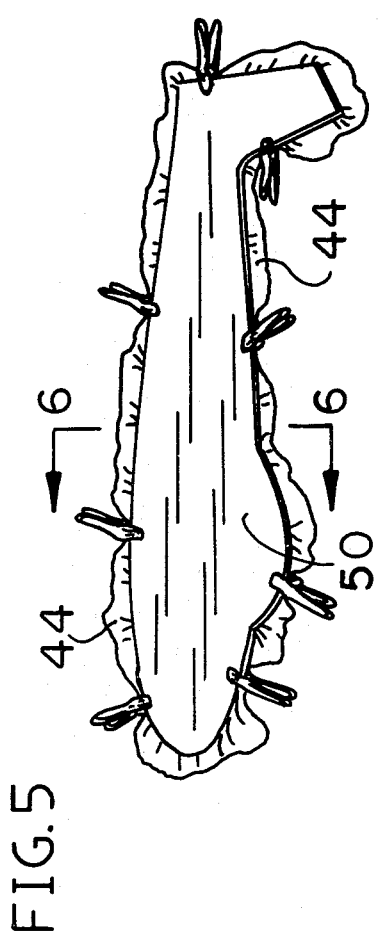
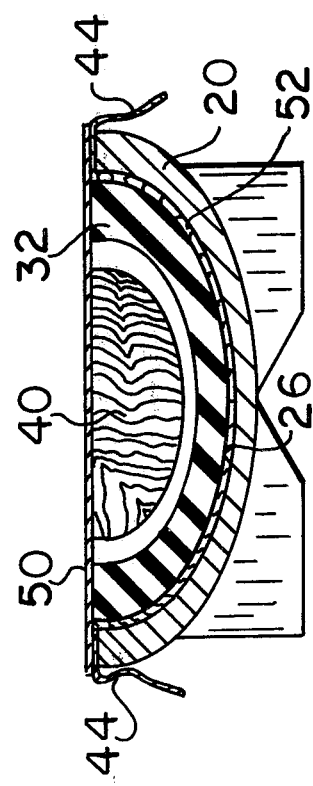
FIG. 5
FIG. 6
FIG. 7

METHOD OF MOLDING EGGSHELL THIN BODIES

BACKGROUND OF THE INVENTION

1. Field of the Invention

The invention relates to cast-molding polymeric resins and more particularly relates to a method of molding very thin (eggshell type) components for model making.

2. Brief Description of the Prior Art

It was known prior to my inventon to mold by casting techniques, component parts for modeling including thin bodies. However, the prior art techniques and methods have not been entirely satisfactory for a number of reasons. For example, it has heretofore been difficult to obtain relatively large cast bodies having uniform thickness throughout the body members. If the body in its use, for example as a fuselage component for a model airplane, is subjected to various physical stresses the heterogeneous body is likely to fracture. If the body member could be made more homogenous in thickness, the likelihood of fracturing under the same stress conditions is substantially reduced.

By method of the invention, thin (0.010" to 0.060"), members may be cast molded in any desired size and configuration. The body members so produced are of a controlled, homogeneous thickness throughout and may include integrally molded bulkheads, inserts, trays and like support members. In reinforced castings such as fiberglass fabric reinforced polyester castings. The glass fiber fabric to resin ratio is more uniform throughout the cast body, facilitating the production of thinner, lighter and stronger castings. The ease of control of resin distribution throughout the mold assures a homogenous structure which will expand and contract uniformly with changes of temperature, reducing to a minimum the deflections now observed in prior art castings.

The method of the invention also facilitates the use of more intricately detailed molds with finished surfaces, thereby reducing hand work required to finish the casting. Through use of the method of the invention, it is possible to reduce the cost of assembling parts and to reduce hand labor often required by distortion of cast parts made by the prior art techniques. Mass production capabilities are advantageously employed with the method of the invention. Further, because bulkheads and like support members are integrally formed or fused with the body member casting, there can be a considerable weight saving over the prior art methods, which often require the installation of heavy bulkheads and support members made out of plywood or like materials.

SUMMARY OF THE INVENTION

The invention comprises a method of molding thin (eggshell type) bodies for model making, having integrated internal support members, which comprises;

(a) providing a female mold member bearing a first mold surface for at least a portion of the outer surface of the body to be molded;

(b) providing a compressible male mold member bearing a second mold surface for at least a portion of the inner surface of the body to be molded and an opposite surface for receiving a rigidifying member, said male mold member being adapted to mate with and complement said female mold member so as to form a mold cavity for the body to be molded, between the first and second mold surfaces, said male mold member having at least one cavity therein communicating with the second mold surface and forming a third molding surface for forming a support member integral to the inner surface of the body to be molded;

(c) providing a rigidifying member adapted to be received by the opposite surface of said male mold member and to rigidify said male member when received therein;

(d) casting a body forming, liquid, curable, polymeric resin on the first molding surface, in a proportion sufficient to fill to excess said mold cavity and the cavity in the male mold member;

(e) inserting the rigidifying member into the male mold member;

(f) assembling the male mold member with the female mold member;

(g) pressing the casting between the male and female mold members; whereby excess casting is expressed from the mold cavity;

(h) curing the resin; and (i) removing the cast and cured body from the mold cavity.

By the method of the invention, very thin but strong cast bodies may be obtained, with controlled, uniform thickness.

The invention also comprises the mold assembly of the invention and its use.

BRIEF DESCRIPTION OF THE DRAWINGS

FIG. 1 is an isometric view of a body member molded by the method of the invention and showing integrated support components.

FIG. 2 is an isometric view from above of a preferred female mold member which may be used in the method of the invention, in preparation for use.

FIG. 3 is an isometric view of the molding surface of a preferred male mold member which may be used in the preferred method of the invention, in preparation for use.

FIG. 4 is a view of the opposite surface of the male mold member shown in FIG. 3, mounted in the female mold member of FIG. 2 and ready to receive a rigidifying member.

FIG. 5 is a view from above of the closed mold used in the preferred method of the invention.

FIG. 6 is a view along lines 6—6 of FIG. 5.

FIG. 7 is a view as seen in FIG. 6, but with the mold parts disassembled and enlarged.

DETAILED DESCRIPTION OF THE PREFERRED EMBODIMENTS OF THE INVENTION

Figure 8:
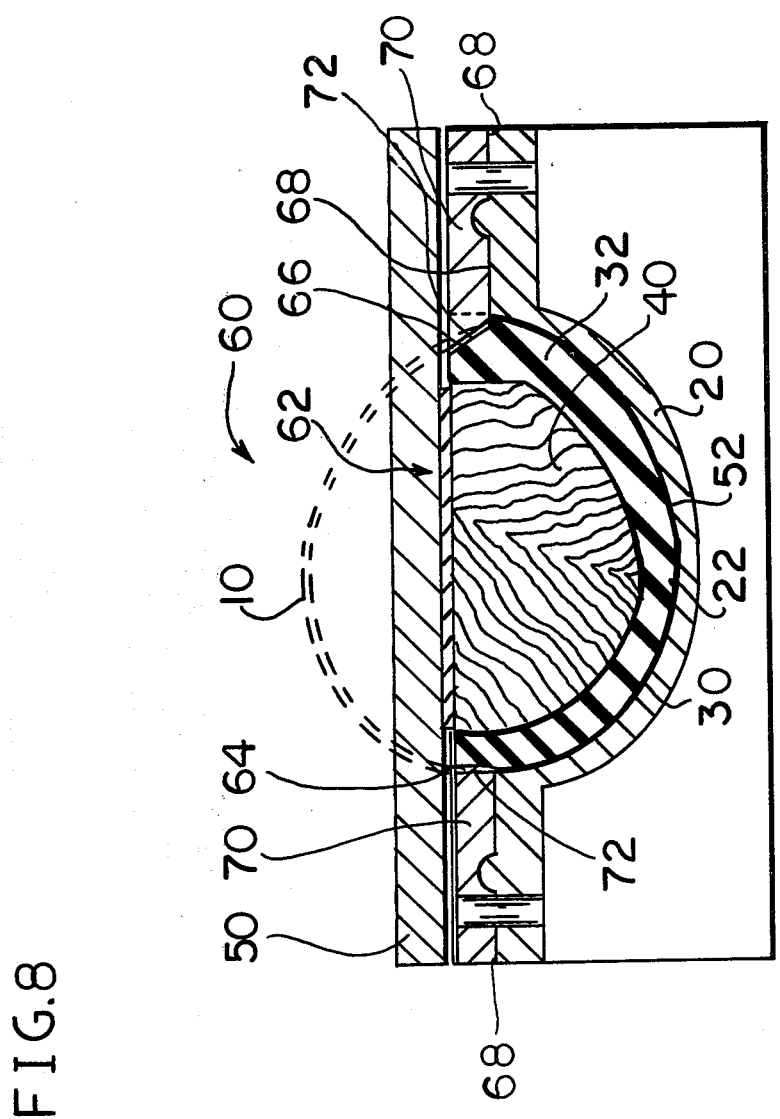
FIG. 8 is a cross-sectional view through a mold used in a preferred embodiment method of the invention.

FIG. 1 is an isometric view of a fuselage half for a model airplane as seen from the inner side. The half fuselage component 10 is a monolithic, unitary casting from a body forming, liquid, curable, polymeric resin reinforced with, for example, a fiberglass fabric. Included in the monolithic casting of the half fuselage 10 are integrated support members or bulkheads 12 formed in a single casting employed to fabricate the half fuselage 10. It will also be observed that by the method of the invention resulting in the half fuselage 10, apertures such as aperture 14 may be made in the cast body during casting. The half fuselage 10 may be prepared according to the method of the invention as described below.

Referring to FIG. 2, one may observe a female mold member 20 bearing a first mold surface 22 upon which the outer surface of the half fuselage 10 is molded. The outer surface of the half fuselage 10 (not seen in FIG. 1) is smooth and corresponds to mold surface 22 in shape, dimension and configuration. Mold surface 22 is non-elastic, non-compressible and unyielding when pressure is exerted against it. The method of making female mold members such as female mold member 20 are well known to those skilled in the art. They generally are made by superposing a model to be copied with a woven reinforcing fabric such as a fiberglass fabric and impregnating the fabric with a hardenable polymeric such as a curable polyester resin, a thermosetting epoxy resin or the like. Upon hardening, the resulting fabric shell is removed and its inner surface forms the female mold. The molding surface 22 may be prepared for use according to the method of the invention by first applying a mold release agent 24 as shown in FIG. 2. The mold release agent 24 may be any conventional mold release agent such as a silicone oil or a polymeric film formed in solvent such as polyvinyl alcohol in an organic solvent and the like. The agent may be applied by any conventional method, to mold surface 22. For example, mold release agent 24 may be applied by spray, brush, aerosol or like application techniques as shown in FIG. 2.

Following the application of a mold release agent to mold surface 22 there is cast a body forming, liquid curable, polymeric resin 26 on mold surface 22. As shown in FIG. 2, this is being carried out by brush application of a viscous liquid polyester in admixture with a curing agent but any other resin may be used such as, for example, a polyepoxide and the like. When casting is to be reinforced, the mold surface may be first covered with, for example, a woven reinforcing fabric such as fiberglass fabric and the resin 26 is then brushed into the fabric. Alternatively, a thin layer of casting resin 26 may be first applied and then the woven fiberglass fabric emplaced thereover. Then an additional coating of the resin 26 may be applied to the upper side of the woven fiberglass fabric and worked into the fabric. In any event, it is advantageous to cast sufficient resin with or without reinforcement to more than fill the mold cavity, to be described more fully hereinafter, between male and female mold members. This will assure that the mold cavity will be completely filled with body forming resin and the coating will be free of voids. Any suitable body forming, liquid, curable, polymeric resin 26 may be employed in the method of the invention. For example, the resin may be a polyepoxide cured with a cross-linking agent or a phenolformaldehyde resin which is convertible from its liquid to its insoluble form in the presence of heat (which may be generated by known catalysts mixed with the liquid resin). A preferred liquid resin 26 material for casting is a liquid, thermosetting resin of the polyester type. Such resins 26 are well known to those skilled in the art and are generally cured by admixture with a heat-generating catalyst.

Further, according to the method of the invention, there is provided a compressible, elastic, male mold member bearing a mold surface complementary to that of female mold member 20. Referring now to FIG. 3, one may see an isometric view of the molding surface 30 and of male mold member 32. The male mold member 32 is adapted to mate with and complement female mold member 20 so as to form a mold cavity for the half fuselage member 10 between mold surface 22 of female mold member 20 and mold surface 30 of male mold member 32. It will be observed that the male member 32 has a plurality of cavities 33 or channels in the mold surface 30, communicating with mold surface 30 and forming additional molding surfaces for forming support members 12, integral and integrated with the half fuselage 10. Cavity 34 as shown in FIG. 3 is in the process of being partially filled with a strip of reinforcing, woven fiberglass fabric 36 by forcing the strip of fabric 36 into the cavity 34 with a hand tool. The peripheral edges of fabric 36 extend outside of cavity 34 and are folded over the adjacent surface 30. Subsequently, the emplaced fabric 36 is impregnated with resin 26 in excess of that required to fill the cavity 34 as is shown for fabric strip 37 emplaced in one of the additional cavities in the surface 30 of male mold member 32.

Male mold member 32 may be constructed according to the following technique. The female mold member 20 (which may be made out of fiberglass or any other material) is provided as described above. The molding surface 22 is coated with a mold release agent such as those previously described and in the manner previously described. Over the release agent prefabricated support member prototypes for inserts, bulkheads and like support members such as insert 14A are positioned and secured to mold surface 22 by any conventional means. An insert for forming each of the cavities 33, 34 and 37 is placed on the mold surface 22. Preferably, the support member prototypes are secured by an adhesive means to the mold surface 22. Any other guides for servo trays or supports as needed are positioned on the surface 22. Once this is accomplished, a liquid, mold forming precursor of a compressible, flexible, resilient polymeric resin such as a mold forming natural latex material or any other rubbery synthetic resin, which is an elastic, thermosetting material suitable as a mold surface and capable of standing moderately high temperatures may be cast over the parting agent. Representative of synthetic, rubbery mold forming materials are butadiene-acrylonitrile copolymer elastomers, silicone rubber, RTB rubbers and the like. The mold forming material is cast to form a male mold member 32 having a thickness of at least about ¼ inch, preferably ½ inch of the compressible, elastic rubber. If desired, a filler block such as a wood block may be placed over the layer of the mold forming rubber material. This block may be carved as a corrective guide for support members on the molding surface 22 to add support or additional support for the support members previously mounted on surface 22. This filler or supporting block may be suspended floating over the initial layer of mold forming rubbery material with appropriate support blocks or wires. The filler block may also function to provide a rigidifying member for association on a surface opposite to that of the mold surface 30, on male member 32, as will be described in greater detail hereinafter. Once the mold forming application to molding surface 20 has cured, to provide a compressible, male mold member 32 the male mold member 32 is separated from the female mold member 20, washed thoroughly and then prepared for use as described above in reference to FIG. 3. The female mold member 20 is also cleaned following separation of the male mold member 32 and the prototype support members (except for member 14A) separated from the mold surface 22 and discarded. The mold female member 20 is then ready for use in conjunction with the male member 32 according to the method of the invention as follows. The mold is now ready for production of eggshell type, thin body members.

As described above, the molding surface 22 of female mold member 20 has been coated with a body forming, liquid, curable polymeric resin as a casting. In the next step according to the method of the invention the male mold member 32 is assembled with the female mold member 20. This may be accomplished by first inserting a rigidifying member 40 as seen in FIG. 4 into the cavity 42 of male mold member 32. As shown in FIG. 4, the cavity 42 is the opposite surface to the molding surface 30 of male mold member 32 (shown in FIG. 3). The rigidifying member 40 may also be the same filler or supporting block described above as useful in fabricating the compressible male mold member 32. The rigidifying member 40 serves to stiffen and support the compressible male mold member 32. With the rigidifying member 40 emplaced in cavity 42 of male mold member 32, the male mold member 32 is mated with female mold member 20 so as to form a mold cavity between molding surfaces 22 and 30. The male mold member 32 is then pressed downward into the molding cavity so as to express excess casting resin from the mold cavity and close up voids. As shown in FIG. 4, excess reinforcement fabric 44 protrudes from the mold cavity (not seen in FIG. 4) and may be trimmed as desired. Provided the pressure upon male member 32 is evenly distributed, the compressible nature of the molding surface 30 and the unyielding nature of mold surface 22 assures that pressures in the mold cavity are equalized and the distance between molding surface 22 on female mold member 20 and molding surface 30 on male mold member 32 will be controlled and uniform throughout all parts of the mold cavity. The degree of pressure is not critical so long as the excess resin in the mold cavity is displaced. During this step the strips of reinforcing fabric 36 positioned in cavities 33 and 34 are integrated with the body forming resin 26 in the mold cavity. This yields a casting of uniform thickness and homogenecity. The mold is then closed as shown in FIG. 5 with a covering pressure plate 50. This holds the casting in place and under pressure. When the resin material of the casting has cured, according to the nature of the resin, the mold may be opened and the body of the molded half fuselage 10 removed from the mold cavity 52.

FIG. 6 is a cross-sectional view along lines 6—6 of FIG. 5 and shows in greater detail the relationship of mold parts and cast member. The mold cavity 52 may also be seen in FIG. 6. FIG. 7 is a view as shown in FIG. 6 but with the mold parts and cast and cured member 10 separated to show greater detail.

It will be appreciated that upon the production of two fuselage halves, they may be joined and assembled with appropriate parts to make an airplane model with integrated support members.

FIG. 8 is a cross-sectional view through a preferred mold for use in a preferred embodiment method of the invention. In this embodiment, a fuselage half is made which is not symmetrical and is not identical with the mating fuselage half 10 described above. In order to make the unsymmetrical half, extra or additional steps are needed to carry out the method of the invention. In the mold 60 shown in FIG. 8, parts analogous to parts in the previously described mold of FIG. 6 are numbered with the same numbers. Thus, the assembled mold 60 comprises a female mold member 20 and a male mold member 32 which complement each other and form a mold cavity 52 between the mold surface 22 of female mold member 20 and the mold surface 30 of male mold member 32. The male mold member 32 of compressible, elastic, rubbery material is rigidified and supported by the wood filler block 40. A filler sheet 62 is positioned over block 40 so that when plate 50 is pressed down, additional leverage is obtained to press the male mold member 32 towards the molding surface 22 of the female mold member 20. This, as previously described, forces excess resin 26 out of the mold cavity 52 at open sites or vents 64, 66. Unlike the mold of FIG. 6, the upper edge of the mold cavity 52 does not terminate at center line 68 in the mold assembly 60. The center line 68 corresponds to the center line of a completed model fuselage after the assembly of two fuselage halves 10. In the mold assembly 60, an extension frame 70 extends the mold cavity 52 a sufficient distance beyond center line 68 so that a mounting flange 72 is integrally formed on the peripheral edge of the fuselage half 10. This flange 72 is offset inwardly from the projected position of an extension to the peripheral edge of the fuselage half 10, a sufficient distance to receive and mate with the inner surface of the peripheral edge of the non-extended, symmetrical fuselage half 10 previously described. In this manner, the symmetrical half fuselage 10 (shown by broken lines in FIG. 8) may be conveniently bonded and secured to the unsymmetrical half when the cast unsymmetrical half is removed from the mold assembly 60. This has the advantage of enabling one to assemble the fuselage halves without a need for special tools and without requiring one to make openings in the cast members to facilitate the insertion of assembly tools, etc. The joint along the centerline can also be made stronger by the supporting flange 72.

Additional steps may be advantageous to make the male mold member 32 for the unsymmetrical fuselage half made in the mold assembly 60, to obtain the provision of flange 72. First, before casting the rubber material to make the male mold member 32, a groove of about ¼ inch depth may be made, using a router bit, in the frame of the female mold member 20 as a guide for the enclosure frame 70. This frame 70 may be made out of sheet plastic about ¼ inch thick and will have the same shape of the center line surface of the female mold member 20. This frame 70 may be pinned down into the female mold member 20 to form the shape of the flange 72 extension and at the same time a built-in guide around the upper end of the also extended male mold member 32.

The mold assembly 60 is operated or used in the method of the invention using the same steps described above for the use of the mold assembly shown in FIG. 6. The unsymmetrical half-fuselage cast and cured in the mold assembly 60 may be joined with a symmetrical half-fuselage to produce a complete fuselage.

Those skilled in the art will appreciate that many modifications may be made to the above described method of the invention without departing from the spirit and the scope of the invention. For example additional mold support elements such as frames, clamps etc., may be applied to hold mold components in position relative to each other. Also, other model components such as fuel tanks and like inserts may be integrated into the final body members by pre-positioning them on the mold surface prior to casting the body forming resins.

What is claimed:

1. A method of molding thin (eggshell type) bodies for model making, having an integrated internal support member, which comprises;
   (a) providing a female mold member bearing a first mold surface for at least a portion of the outer surface of the body to be molded;
   (b) providing a compressible male mold member bearing a second mold surface for at least a portion of the inner surface of the body to be molded and an opposite surface for receiving a rigidifying member, said male mold member being adapted to mate with and complement said female mold member so as to form a mold cavity for the body to be molded, between the first and second mold surfaces, said male mold member having at least one cavity therein communicating with the second mold surface and forming a third mold surface for forming a support member integral to the inner surface of the body to be molded;
   (c) providing a rigidifying member adapted to be received by the opposite surface of said male mold member and to rigidify said male mold member when received therein;
   (d) casting a body forming, liquid, curable, polymeric resin on the first molding surface, in a proportion sufficient to fill to excess said mold cavity;
   (e) inserting the rigidifying member into the male mold member;
   (f) forming the support member by filling the cavity in the male mold member with a body forming liquid, curable, polymeric resin;
   (g) assembling the male mold member with the female mold member, so as to place the resin filled mold cavity in communication with the resin covered third mold surface and whereby the resin in the cavity is joined with the resin on the third mold surface;
   (h) pressing the casting between the male and female mold members, whereby excess casting is expressed from the mold cavity;
   (i) curing the resin; and
   (j) removing the cast and cured body with integrated support member from the mold cavity.

2. The method of claim 1 wherein the casting is reinforced by placing a reinforcing fabric in the mold cavity.

3. The method of claim 1 wherein said body forming resin is a polyester.

4. The method of claim 1 wherein a reinforcing fabric is inserted in the cavities on the second molding surface prior to assembly of the male mold member with the female mold member.